United States Patent
Creamer et al.

(10) Patent No.: US 7,072,957 B2
(45) Date of Patent: Jul. 4, 2006

(54) REMOTE ADMINISTRATION AND MONITORING OF A SERVICE COMPONENT IN A SERVICE LOGIC EXECUTION ENVIRONMENT

(75) Inventors: Thomas E Creamer, Boca Raton, FL (US); Zygmunt A Lozinski, Winchester (GB); Victor S Moore, Boynton Beach, FL (US); Glen R Walters, Hollywood, FL (US)

(73) Assignee: International Business Machines Corporation, Armonk, NY (US)

(*) Notice: Subject to any disclaimer, the term of this patent is extended or adjusted under 35 U.S.C. 154(b) by 889 days.

(21) Appl. No.: 09/871,402

(22) Filed: May 31, 2001

(65) Prior Publication Data

US 2002/0184353 A1 Dec. 5, 2002

(51) Int. Cl.
*G06F 15/173* (2006.01)
*G06F 3/00* (2006.01)
*H04L 12/66* (2006.01)
*H04M 3/42* (2006.01)

(52) U.S. Cl. .................... 709/223; 709/202; 709/224; 709/226; 370/352; 370/259; 379/201.03; 379/230; 719/318; 719/328

(58) Field of Classification Search ................ 709/223, 709/224, 226, 202; 379/219, 201.03, 230; 370/352, 259; 717/109; 719/318, 328
See application file for complete search history.

(56) References Cited

U.S. PATENT DOCUMENTS

| 5,301,270 | A | | 4/1994 | Steinberg et al. | |
|---|---|---|---|---|---|
| 5,812,533 | A | * | 9/1998 | Cox et al. | 370/259 |
| 5,920,692 | A | | 7/1999 | Nguyen et al. | |
| 6,006,251 | A | | 12/1999 | Toyouchi et al. | |
| 6,061,721 | A | | 5/2000 | Ismael et al. | |
| 6,098,116 | A | | 8/2000 | Nixon et al. | |
| 6,115,040 | A | * | 9/2000 | Bladow et al. | 709/203 |
| 6,594,355 | B1 | * | 7/2003 | Deo et al. | 719/315 |

OTHER PUBLICATIONS

W. Seigneur, *The Open Architecture Distributed Switching Model, Building the Network Operating System for the Information Superhighway*, SONe Tech, Inc. <http://www.sonetech.com/conferences/nfoec94.html>.

Keijzer, et al., *JAIN: A New Approach to Services in Communication Networks*, pp. 94-99, IEEE Communications Magazine, (Jan. 2000).

(Continued)

*Primary Examiner*—Jason Cardone
*Assistant Examiner*—Tanim Hossain
(74) *Attorney, Agent, or Firm*—Akerman Senterfitt

(57) ABSTRACT

A method of directly administering a service component through a hypermedia document can include a series of steps. The hypermedia document can provide an interface to a service logic execution environment (SLEE). At least one administrative option embodied in the hypermedia document can be provided. The at least one administrative option can correspond to a function to be performed by the service component. A user specified administrative option can be received in the hypermedia document and a SLEE compatible event can be generated based on the user specified administrative option. The event can be a type which the service component has been registered in the SLEE to receive. Also, the event can be routed to the service component via the SLEE. The service component can process the event and perform an administrative function consistent with the event.

12 Claims, 3 Drawing Sheets

OTHER PUBLICATIONS

Jain, et al., *Java Call Control, Coordination, and Transactions*, pp. 108-114, IEEE Communications Magazine, (Jan. 2000).

Beddus, et al., *Opening Up Networks with JAIN Parlay*, pp. 136-143, IEEE Communications Magazine, (Apr. 2000).

Bhat, et al., *JAIN Protocol APIs*, pp. 100-107, IEEE Communications Magazine, (Jan. 2000).

S. Silberstang, *Service Creation for Advanced Intelligent Networks Utilizing Intelligent Peripherals*, (Mar. 2001) <http://www.amarex.com/service.html>.

Keijzer, et al., *The Telephony Interoperability Challenge*, Sun Journal, (Mar. 2001) <http://www.sun.com/dot-com/sunjournal/v3n2/Telephony.html>.

JAIN™; *Integrated Network APIs for the JAVA™ Platform*, (Sep. 2000) <http://www.java.sun.com/products/jain/>.

JAIN™ SCE/SLEE API Specification, (Mar. 2001) <http://www.javasoft.com/aboutJava/communityprocess/jsr/jsr_022_jsce.html>.

*Software Patent Institute Database of Software Technologies*, TDB0499.0069, (Apr. 1999) <http://www.spi.org>.

Brackenbury I.F. et al., *IBM's Enterprise Server for Java*, IBM Systems Journal, vol. 37, No. 3, pp. 323-335, (1998).

*Client Application for Integrating a Development Environment with a Web Distributed Authoring (WebDAVI Server*, IBM Technical Disclosure Bulletin, Serial No. TDB0499.0069, (Apr. 1999).

Spitzer, Tom, *Component Architectures*, DBMS Tools & Strategies for IS Professionals, pp. 56-66, (Sep. 1997).

\* cited by examiner

REMOTE ADMINISTRATION AND MONITORING OF A SERVICE COMPONENT IN A SERVICE LOGIC EXECUTION ENVIRONMENT

BACKGROUND OF THE INVENTION

1. Technical Field

This invention relates to the field of telecommunications, and more particularly, to a method of administering service components.

2. Description of the Related Art

The development of the open network application programming interface (API) represents an important departure from the traditional method by which the architecture of the public switched telephone network (PSTN) was first opened. Traditionally, the Advanced Intelligent Network (AIN) architecture defined a call model which allowed the creation of telecommunications service applications outside of the switch environment. Telecommunications service applications are a la carte telecommunications applications which can perform enhanced services for a telecommunications session established among two or more parties. Exemplary service applications can include Call Waiting, Caller ID, Call Forwarding, Voice Activated Dialing, and Meet-me Conferencing.

When AIN first had been introduced, in terms of the service application creation process, the AIN architecture represented an important advance. AIN separated service development from switching, allowing service logic components to be developed more quickly and placed in specialized network elements attached to databases. Switches, in turn, being free from all service logic, could be optimized for speed and efficiency. Still, typical service applications which were developed to the AIN specification were written in specialized languages by specially trained programmers using specialized service creation environments.

Importantly, future telecommunications networks will be characterized by new and evolving network architectures where packet-switched, circuit-switched, and wireless networks are integrated to offer subscribers an array of innovative multimedia, multiparty applications. Equally important, it is expected that the process by which telecommunications applications are developed will change, and will no longer solely be the domain of the telecommunications network or service application provider. In fact, in order to provide a broad portfolio of novel, compelling applications rapidly, service application providers will increasingly turn to third-party applications developers and software vendors. Thus, application development in the telecommunications domain will become more similar to that of software and information technology in general, with customers reaping the benefits of increased competition, reduced time to market, and rapid leveraging of new technology as it is developed.

To make this vision a reality, the principles of AIN have been discarded in favor of a new service application component development paradigm. Specifically, it has been recognized that future integrated networks must offer application developers a set of standard, open APIs so that applications written for compatibility with one vendor's system can execute in the system of another vendor. In consequence, the cost of applications development can be amortized, reducing the final cost to the customer. Java™ APIs for Integrated Networks (JAIN) fulfills the requirements of the new service application component development paradigm. Presently, JAIN includes standard, open published Java™ APIs for next-generation systems consisting of integrated Internet Protocol (IP) or asynchronous transport mode (ATM) networks, PSTN, and wireless networks. The JAIN APIs include interfaces at the protocol level, for different protocols such as Media Gateway Control Protocol (MGCP), Session Initiation Protocol (SIP), and Transactional Capabilities Application Part (TCAP), as well as protocols residing in the higher layers of the telecommunications protocol stack.

JAIN includes a set of integrated network APIs for the Java™ platform and an environment to build and integrate JAIN components into services or applications that work across PSTN, packet and wireless networks. The JAIN approach integrates wireline, wireless, and packet-based networks by separating service-based logic from network-based logic. FIG. 1 illustrates a conventional JAIN implementation. As shown in FIG. 1, a conventional JAIN implementation can include a protocol layer 102 which can include interfaces to IP, wireline and wireless signaling protocols. These protocols can include TCAP, ISUP, INAP, MAP, SIP, MGCP, and H.323. The JAIN implementation also can include a signaling layer 103 which can include interfaces to provide connectivity management and call control. The conventional JAIN implementation also can include an application layer 104 for handling secure network access and other external services 105. Finally, the conventional JAIN implementation can include a service layer 106 which can include a service creation and carrier grade service logic execution environment (SLEE) 108.

In JAIN, the protocol layer 102 and the signaling layer 103 are based upon a Java™ standardization of specific signaling protocols and provide standardized protocol interfaces in an object model. Additionally, applications and protocol stacks can be interchanged all the while providing a high degree of portability to the applications in the application layer using protocol stacks from different sources. By comparison, the application layer 104 provides a single call model across all supported protocols in the protocol layer 102. Fundamentally, the application layer 104 provides a single state machine for multiparty, multimedia, and multiprotocol sessions for service components in the application layer 104. This state machine is accessible by trusted applications that execute in the application layer 104 through a call control API.

Notably, applications or services executing at the service level 102 can communicate directly with protocol adapters in the SLEE 108. Protocol adapters typically are class methods, callbacks, event or interfaces that encapsulate the underlying resources such as TCAP, MGCP, etc. The underlying resources can be implemented in many programming languages, but a JAIN-conformant protocol product must provide at least the relevant JAIN API. In contrast, an external application or service executing in the application layer 104 does not have to be aware of the underlying resources and can remain oblivious to the fact that some of its session or call legs may be using different protocols.

Service components 112 are the core JAIN components and can execute in the SLEE 108. More particularly, service components 112 are constructed according to a standard component model and, instantiations of component assemblies execute in coordination with the SLEE 108. Using information regarding the protocol layer 102 which can be incorporated into the SLEE 108, service components 112 can interact with the underlying protocol stacks without having specific knowledge of the protocol stack. Thus, service components 112 can use the call model provided by the signaling layer to implement telephony services. More importantly, the SLEE 108 can relieve the service components 112 of conventional lifecycle responsibilities by providing portable support for transactions, persistence, load balancing, security, and object and connection instance pooling in this way, the service components 112 can focus on providing telephony services.

Presently, a service owner, operator, or administrator can administer various aspects of a service component such as call forwarding, call blocking, or messaging. The administration of a service component can include, but is not limited to, monitoring and reporting on various aspects of a service component such as the service components usage, the number of users accessing a particular service component, the number of calls being processed by service component, and monitoring a subscriber's service. Service administration also can include halting the execution of a service component, starting the execution of a service component, and loading and unloading a service component within the SLEE.

Although service component administration can be performed in conventional systems, such administrative functionality requires a completely separate administrative system. As shown in FIG. 1, a conventional administrative system 107 for administering a service component is separate and distinct from the service components being administered. Such administrative systems operate external to the JSLEE 108. Accordingly, administrative systems comparable to administrative system 107 require additional hardware and software for communicating with the JSLEE 108.

SUMMARY OF THE INVENTION

The invention disclosed herein concerns a method and a system for providing a Web-based interface for administering a service component in a service logic execution environment (SLEE). In particular, the invention disclosed herein can provide a common interface for both service administration personnel and service assurance personnel for purposes of monitoring and administering service information for a plurality of services and service components. The invention can provide this functionality using a hypermedia document in conjunction with the service component without the aid of a separate and distinct administrative system. Through the hypermedia document, a SLEE compatible event can be generated responsive to a user request to administer a service component. The service component can be configured to receive events generated by the hypermedia document interface via the SLEE. Upon receiving such an event, the service component can implement an administrative function consistent with the received event.

One aspect of the present invention can include a method of administering a service component through a hypermedia document. The hypermedia document can provide an interface to a SLEE. The method can include providing at least one administrative option included in the hypermedia document, wherein the selection can correspond to an administrative function to be performed by the service component. A user specified administrative option can be received in the hypermedia document and a SLEE compatible event can be generated based on the user specified administrative option. The event can be of a type which the service component has been registered in the SLEE to receive. The event can be routed to the service component via the SLEE. In consequence, the service component can process the event and can perform an administrative function consistent with the event. Finally, administrative information, which can include real-time information, can be received from the service component.

Another embodiment of the invention can include registering the service component with the SLEE for receiving a SLEE compatible event generated by the hypermedia document. The event can be received over a computer communications network such as the Internet and posted to the SLEE. Subsequently, the event can be received by the service component. The method further can include performing an administrative function consistent with the received event. Administrative information, which can include real-time information provided by the service component and included in a dynamically generated hypermedia document displayable in a hypermedia document browser in the computer communications network.

Another aspect of the invention can include a machine readable storage, having stored thereon a computer program having a plurality of code sections executable by a machine for causing the machine to perform a series of steps. In that case, the steps can include providing at least one administrative option embodied in a hypermedia document, wherein the administrative option can correspond to a service component. The service component can execute in a SLEE and the hypermedia document can provide an interface to the SLEE. The method also can include receiving a user specified administrative option in the hypermedia document and generating a SLEE compatible event based on the user selection. The event can be of a type which the service component has been registered in the SLEE to receive. Also, the event can be routed to the service component via the SLEE. Subsequently, the service component can process the event and perform an administrative function consistent with the event. Finally, administrative information, which can include real-time information, can be received from the service component.

Another embodiment of the invention can include registering a service component with a SLEE for receiving a SLEE compatible event generated by a hypermedia document. The hypermedia document can provide an interface to the SLEE. The event, being posted to the SLEE, can be received by a service component. An administrative function consistent with the received event can be performed. Finally, administrative information, which can include real-time information, can be provided from the service component and included in a dynamically generated hypermedia document displayable in a hypermedia document browser in the computer communications network.

BRIEF DESCRIPTION OF THE DRAWINGS

There are shown in the drawings embodiments of which are presently preferred, it being understood, however, that the invention is not so limited to the precise arrangements and instrumentalities shown, wherein.

DETAILED DESCRIPTION OF THE INVENTION

The invention disclosed herein concerns a method and a system for providing a Web-based interface for remotely administering a service component. The service component can execute within a service logic execution environment (SLEE). In particular, the invention can provide this functionality without the aid of specific, external administrative applications or hardware. The service component can be configured to receive events generated by the Web-based interface via the SLEE. Thus, upon receiving such an event, the service component can perform an administrative function in a manner consistent with the received event.

Administrative functions can include, but are not limited to, the monitoring or reporting of any information or service component operational parameters for which the service component has been programmed to report. For example, the service component can provide information relating to the service component's usage, the number of users accessing the service component, the number of calls being processed by the service component, or an individual subscriber's service. Such administrative information can be monitored and reported as a compilation of information such as a snap-shot or summary of administrative information, as well as a stream of real-time information.

Other administrative functions can include tasks which a system administrator would be required to perform and which are restricted to users or subscribers. For example, these administrative functions can include, but are not limited to, sensitive operations such as halting the execution of a service component, starting the execution of a service component, and loading and unloading a service component within the SLEE. In any event, the service component can include the necessary functionality for performing the administrative function and communicating with the Web-based interface and need not be accessed using a separate administrative system.

Figure 1:
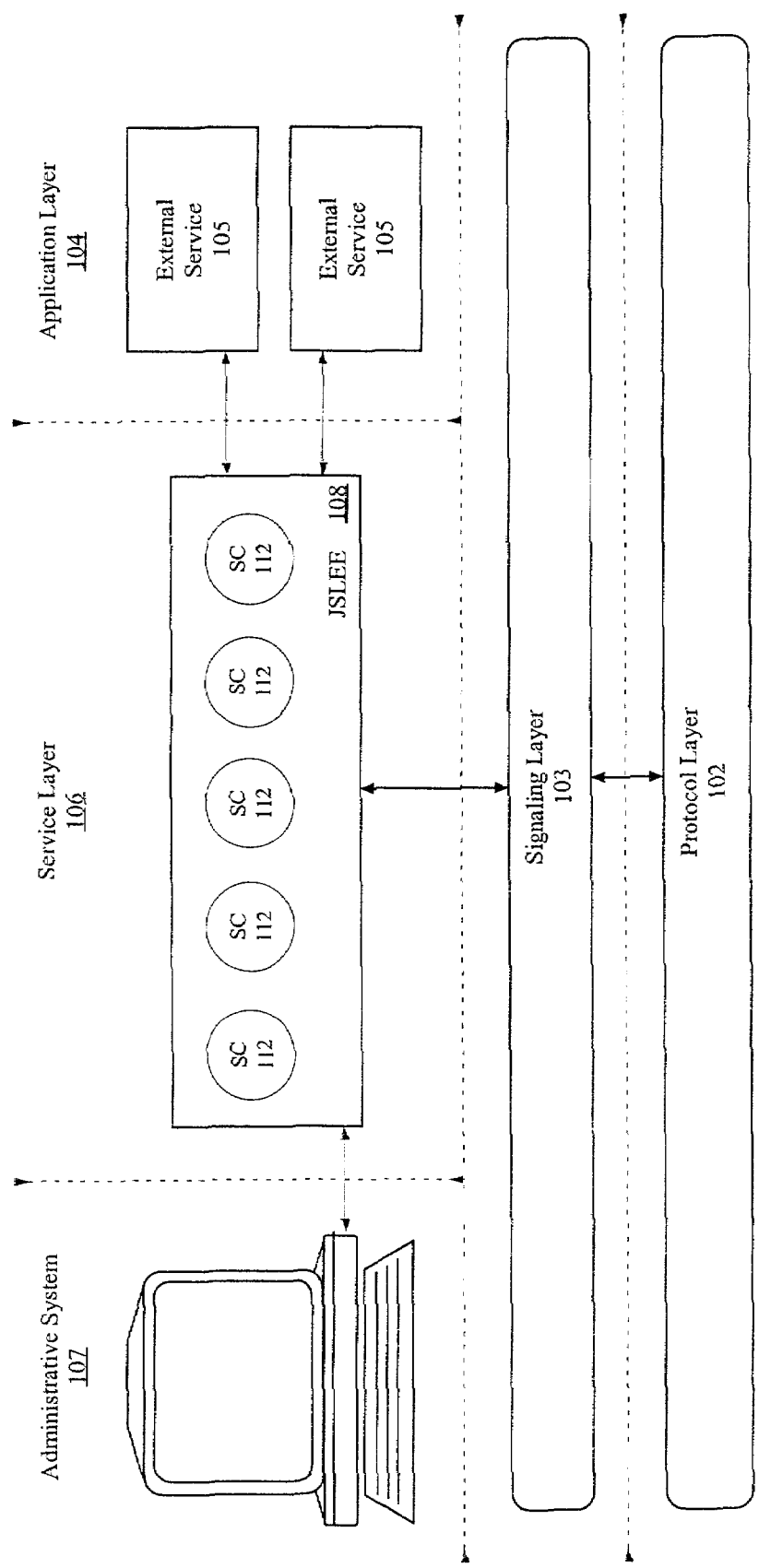
FIG. 1 is a schematic representation of an intelligent network architecture configured in accordance with a conventional JAIN implementation known in the prior art.
Figure 2:
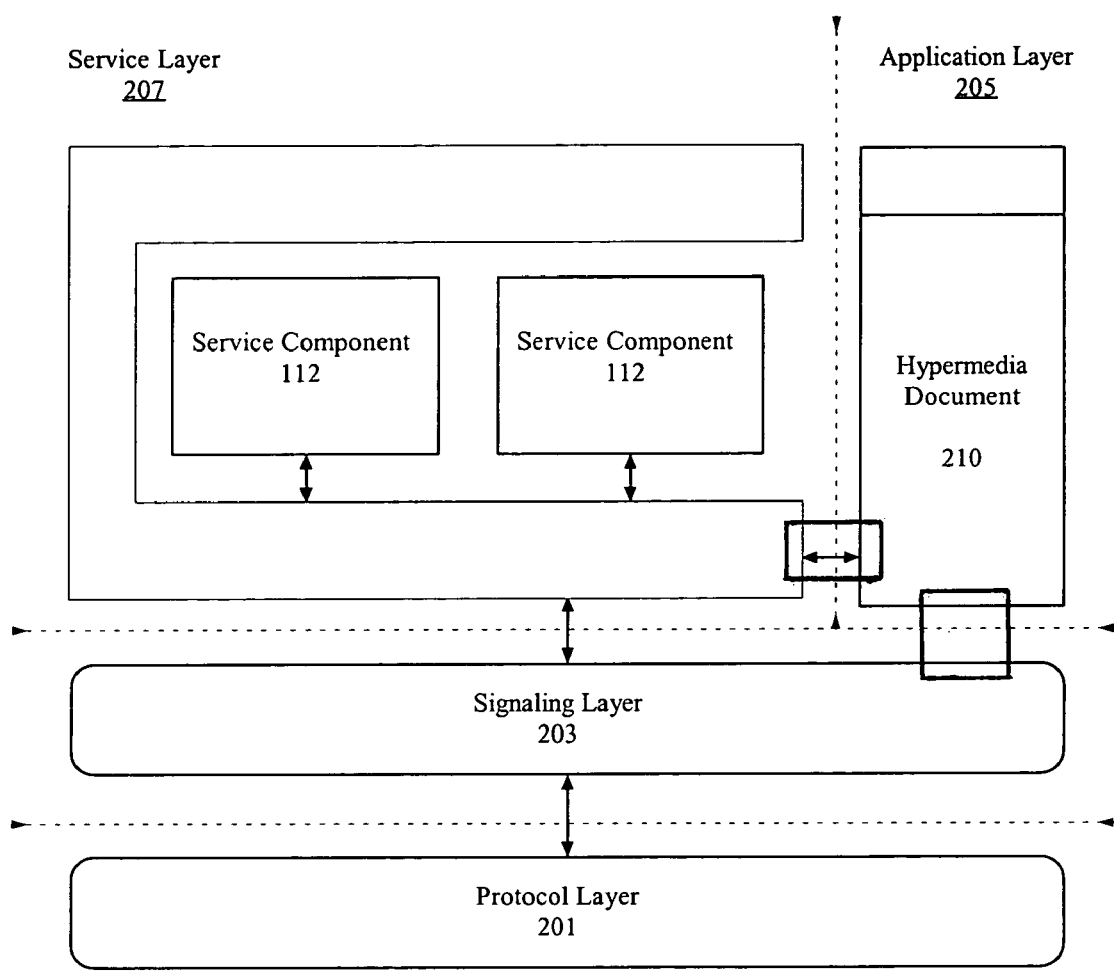
FIG. 2 is a schematic representation of an intelligent network architecture configured in accordance with the inventive arrangements disclosed herein.

FIG. 2 is a schematic illustration of a JAIN-compliant intelligent network configured in accordance with the inventive arrangements. The JAIN-compliant network can include a protocol layer 201, a signaling layer 203, an application layer 205, and a service layer 207. The application layer 205 can host external third party applications. Typical third party applications can suit mass-market demand for services such as virtual private networks (VPNs), inbound services and unified messaging. External third party applications also can include short-lived and niche applications which can be deployed using un-trusted application space deployment technologies such as database lookup interfaces, downloadable mechanisms, and the Parlay API, as are well known in the art. Notably, external applications can include hypermedia documents 210 which can be contained within a Web server connected to the World Wide Web.

The hypermedia document 210 can include administration information such as distribution, load, activate, deactivate, unload, retrieve/rollback status, and the like across a plurality of services and service components. Monitoring options such as real-time measurement information as well as near real-time information, service component usage statistics, system resource usage measurement information, and the like, also can be included for a plurality of services and service components. Additionally, control over administration and service execution parameters of individual service components can be made available from the hypermedia document 210. The hypermedia document 210 can provide a common interface for both service provider personnel providing service assurance and integrity as well as personnel providing service administration capabilities.

The service layer 207 can include a SLEE server such as a JSLEE Server 200 which can be configured for compatibility with the JAIN specification. The protocol layer 201 can include one or more protocol stacks which can be configured to interact with the service components 112 executing in the JSLEE Server 200 through a signaling layer 203. Notably, the invention is not limited in regard to the number or type of protocol stacks. Rather, JSLEE Server 200 can interact with any protocol stack, for example those protocol stacks configured in accordance with the JAIN specification.

The JSLEE Server 200 also can include several lifecycle management functions. In particular, the service components 112 can be properly loaded within the JSLEE Server 200 for execution. The JSLEE Server 200 can identify configuration and loading parameters associated with each service component 112 to be loaded. Subsequently, the JSLEE Server 200 can execute the service components 112 using the identified configuration and loading parameters. Finally, the service components 112 can register with an internal event handling component in the JSLEE Server 200 so that events can be transmitted to and from the service components 112 executing in the JSLEE Server 200.

In operation, the JSLEE Server 200 can transmit and receive events to and from the protocol stacks in the protocol layer 201. More particularly, the events can be transmitted and received in the event handling component included in the JSLEE Server 200. Likewise, service components 112 which are registered with the JSLEE Server can receive protocol stack events directed towards particular ones of the service components 112. More specifically, the event handling component can route received events to service components 112 which have registered with the JSLEE Server 200 to receive such events. The service components 112 further can post protocol stack events to the JSLEE Server 200.

Figure 3:
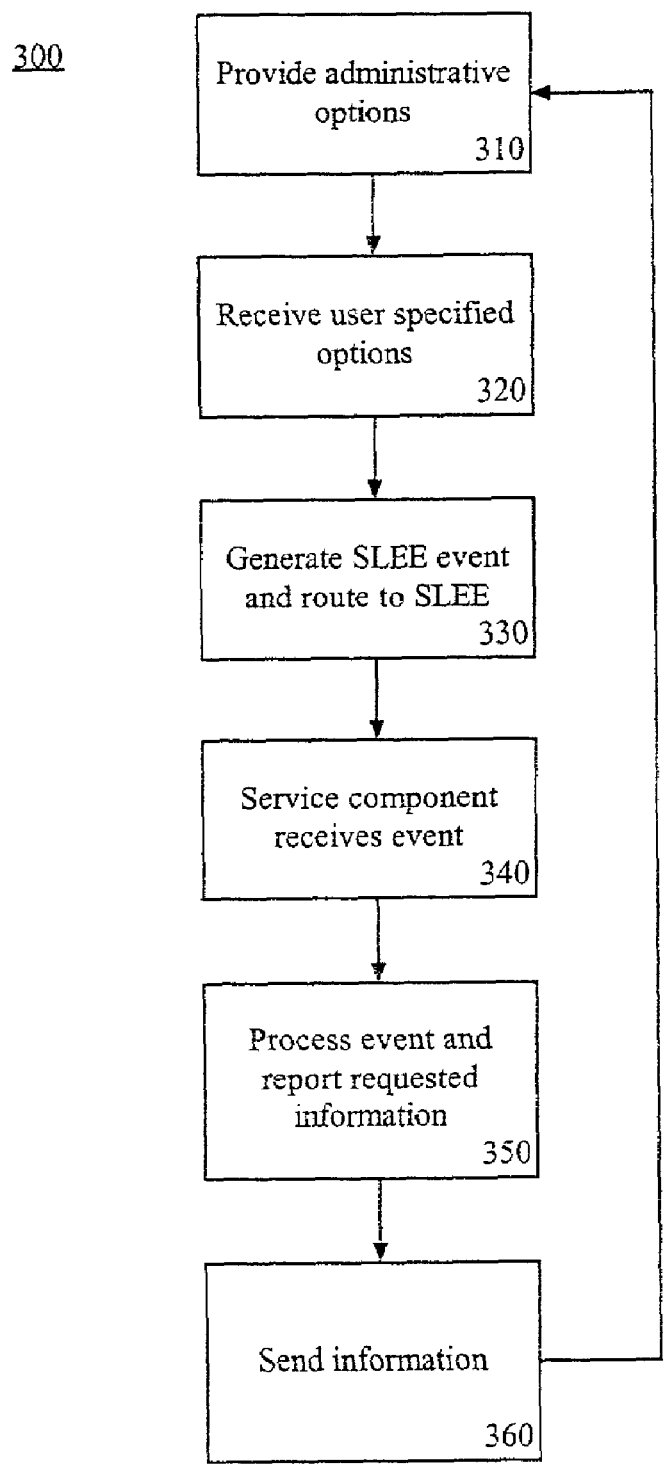
FIG. 3 is a flow chart illustrating an exemplary method of remotely administering a service component.

FIG. 3 is a flow chart 300 illustrating an exemplary method of remotely administering a service component through a Web-based interface. The method of the invention can begin in step 310 where one or more administrative options can be presented to a user through a conventional hypermedia document such as a Web page provided by a Web server. The Web page can include a series of predetermined and configurable options from which the user can choose. For example, the user can select items from a list or be guided through a step by step process of selecting parameters to be administered. Alternatively, the user can be provided a text box or other interface such as a command line wherein the user can initiate administrative functions. After completion of step 310, the method can continue to step 320.

In step 320, the hypermedia document can receive one or more user specified administrative or monitoring options. In step 330, a script or program can be invoked by the hypermedia document which can generate a SLEE compatible event. For instance, the hypermedia document can contain a VB-script or Java-script portion which can include functionality for constructing a SLEE compatible event. Alternatively, the hypermedia document can contain a link to an external script such as a PERL script or an external program such as a Java applet or servlet, either which can construct the SLEE compatible event. In any case, the invention is not limited to the mechanism by which the SLEE compatible event is constructed.

In step 330, once a SLEE compatible event has been generated, the event can be transmitted to the SLEE server via an associated server over a computer communications network such as the Internet. In particular, the event can be transmitted to the associated server using a connection-oriented protocol such as TCP/IP. Alternatively, the event can be transmitted using a higher-order protocol such as HTTP. In any case, the invention is not limited to the precise method of forwarding the event to the server associated with the SLEE. Rather, any suitable communications method can suffice. After completion of step 330, the method can continue to step 340.

In step 340, the SLEE event received in the associated server can be posted to an event handler in the SLEE. A service component being registered with the SLEE server to receive such events can receive the event. In step 350, the service component can process the received event and perform or initiate an administrative function consistent with the received event. For example, the event can specify that the service component be reloaded or unloaded within the SLEE. Also, the event can specify that the service component resume or halt execution within the SLEE. Alternatively, the event can specify that administration information be monitored or reported. In that case, the service component can collect that information and provide a compilation of the administration information. Still, the service component can begin to provide a stream of real-time administrative information. After completion of step 350, the method can proceed to step 360.

In step 360, in response to receiving the SLEE event, the service component can provide the requested administrative information to the requesting user through a dynamically created Web page in which the administrative information can be presented. More particularly, the service component can post to the SLEE server a message containing the administrative information which can be subsequently routed through the associated server over the Internet to a Web browser associated with the user. Importantly, dynamic Web page generation technologies such as Java Server Pages™ can be used to create the Web page in which the administrative information can be presented. Furthermore, it should be appreciated that administrative information can include acknowledgments from the service component indicating whether a particular administrative function was properly performed as well as the status of various administrative functions. For example, an administrative function providing real-time information can optionally continue to execute until explicitly discontinued. Thus, the status of such a function can be active or inactive. After completion of step 360, the method can repeat.

In this manner, two-way communications can be established between the SLEE server and the Web server. Notably, the SLEE server can include service components for sending and receiving information to and from servers on the Internet, as well as service components which can contain and change service administration information. As previously mentioned, these service components can communicate with one another via the event handling component of the SLEE server.

The present invention can be realized in hardware, software, or a combination of hardware and software. A method and system for directly administering service components through a Web-based interface according to the present invention can be realized in a centralized fashion in one computer system, or in a distributed fashion where different elements are spread across several interconnected computer systems. Any kind of computer system —or other apparatus adapted for carrying out the methods described herein is suited. A typical combination of hardware and software could be a general purpose computer system with a computer program that, when being loaded and executed, controls the computer system such that it carries out the methods described herein. The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following a) conversion to another language, code or notation; b) reproduction in a different material form.

What is claimed is:

1. A method of remotely administering a service component comprising:

identifying at least one service logic execution environment (SLEE) service component configured to perform at least one administrative function responsive to an occurrence of corresponding event which said service component has been registered in a SLEE to receive, said at least one administrative function comprising at least one function selected from a group consisting of detecting administrative information of the service component and posting a message containing the administrative information to an event handling component of the SLEE, re-loading the service component within the SLEE, unloading the service component within the SLEE, halting execution of an existing service executing within the service component, and resuming execution of a previously halted service executing within the service component;

providing at least one administrative option included in a hypermedia document, each provided administrative option corresponding to at least one of said administrative functions;

receiving a user specified administrative option in said hypermedia document;

generating a SLEE compatible event based on said user specified administrative option, said generated event being one of said corresponding events;

routing said event to said service component via said event handling component of the SLEE; and said service component processing said event and responsively performing said administrative function consistent with said event.

2. The method of claim 1, wherein said administrative function includes detecting administrative information of the service component and posting a message containing the administrative information to an event handling component of the SLEE.

3. The method of claim 2, wherein said administrative information includes at least one of service component usage information, information related to the number of calls being processed by the service component, information about an individual subscriber's service executing with the service component, and the number of users accessing the service component.

4. A method of remotely administering a service component through a hypermedia document comprising:

registering a service logic execution environment (SLEE) service component with a SLEE to receive particular SLEE compatible events generated by said hypermedia document and posted to an event handler in said SLEE, wherein each of the SLEE compatible events for which the service component registers correspond to at least one administrative function of the service component, said at least one administrative function comprising at least one function selected from a group consisting of detecting administrative information of the service component and posting a message containing the administrative information to an event handling component of the SLEE, re-loading the service component within the SLEE, unloading the service component within the SLEE, halting execution of an existing service executing within the service component, and resuming execution of a previously halted service executing within the service component;

receiving an event posted in said SLEE, wherein said received event is one of said particular SLEE compatible events; and said service component performing said administrative function consistent with said received event.

5. The method of claim 4, wherein said administrative function includes detecting administrative information of the service component and posting a message containing the administrative information to an event handling component of the SLEE, wherein said SLEE conveys the message to a remote user in a computer communications network, where said remote user triggered an occurrence of said event using a Web-based interlace containing said hypermedia document.

6. The method of claim 5, wherein said administrative information includes at least one of service component usage information, information related to the number of calls being processed by the service component, information about an individual subscriber's service executing with the service component, and the number of users accessing the service component.

7. A machine readable storage, having stored thereon a computer program having a plurality of code sections executable by a machine for causing the machine to perform the steps of:

identifying at least one service logic execution environment (SLEE) service component configured to perform at least one administrative function responsive to an occurrence of corresponding event which said service component has been registered in a SLEE to receive, said at least one administrative function comprising at least one function selected from group consisting of detecting administrative information of the service component and posting a message containing the administrative information to an event handling component of the SLEE, re-loading the service component within the SLEE, unloading the service component within the SLEE, halting execution of an existing service executing within the service component, and resuming execution of a previously halted service executing within the service component;

providing at least one administrative option included in a hypermedia document, each provided administrative option corresponding to at least one of said administrative functions;

receiving a user specified administrative option in said hypermedia document;

generating a SLEE compatible event based on said user specified administrative option, said generated event being one of said corresponding events;

routing said event to said service component via said event handling component of the SLEE; and said service component processing said event and responsively performing said administrative function consistent with said event.

8. The machine readable storage of claim 7, wherein said administrative function includes detecting administrative information of the service component and posting a message containing the administrative information to an event handling component of the SLEE.

9. The machine readable storage of claim 8, wherein said administrative information includes at least one of service component usage information, information related to the number of calls being processed by the service component, information about an individual subscriber's service executing with the service component, and the number of users accessing the service component.

10. A machine readable storage, having stored thereon a computer program having a plurality of code sections executable by a machine for causing the machine to perform the steps of:

registering a service logic execution environment (SLEE) service component with a SLEE to receive particular SLEE compatible events generated by said hypermedia document and posted to an event handler in said SLEE, wherein each of the SLEE compatible events for which the service component registers correspond to at least one administrative function of the service component, said at least one administrative function comprising at least one function selected from a group consisting of detecting administrative information of the service component and posting a message containing the administrative information to an event handling component of the SLEE, re-loading the service component within the SLEE, unloading the service component within the SLEE, halting execution of an existing service executing within the service component, and resuming execution of a previously halted service executing within the service component;

receiving an event posted in said SLEE, wherein said received event is one of said particular SLEE compatible events; and said service component performing said administrative function consistent with said received event.

11. The machine readable storage of claim 10, wherein said administrative function includes detecting administrative information of the service component and posting a message containing the administrative information to an event handling component of the SLEE, wherein conveys the message to a remote user in a computer communications network, wherein said remote user triggered an occurrence of said event using a Web-based interface containing said hypermedia document.

12. The machine readable storage of claim 11, wherein said administrative information includes at least one of service component usage information, information related to the number of calls being processed by the service component, information about an individual subscriber's service executing with the service component, and the number of users accessing the service component.

* * * * *